E. E. BOENING.
BRAKE.
APPLICATION FILED APR. 9, 1920.
1,402,042.
Patented Jan. 3, 1922.
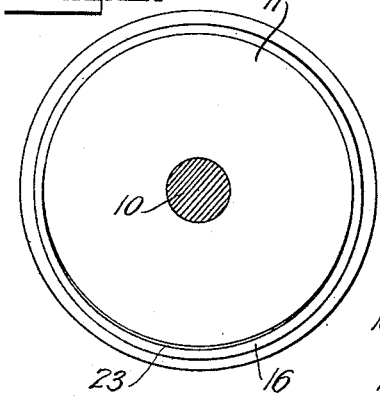
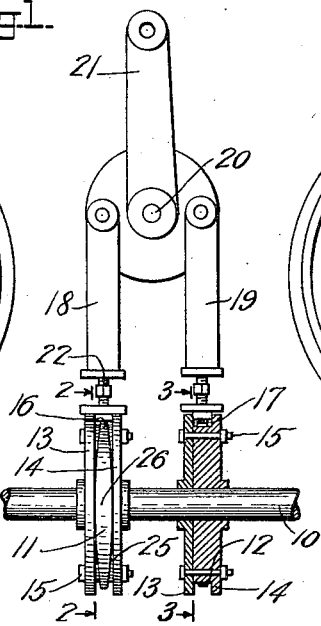
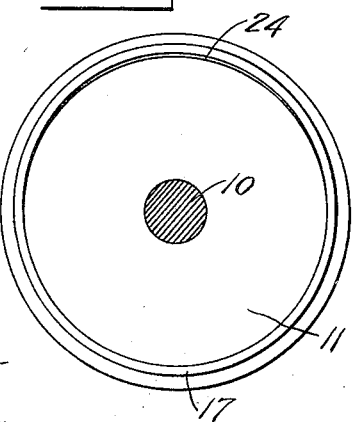
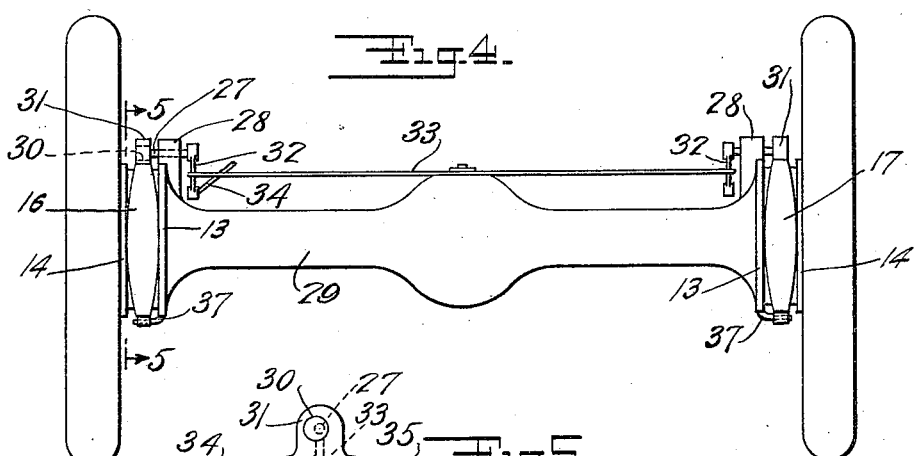
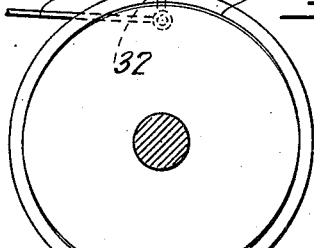
Inventor
Ernest E. Boening
By his Attorney
E. W. Marshall

UNITED STATES PATENT OFFICE.

ERNEST E. BOENING, OF YONKERS, NEW YORK.

BRAKE.

1,402,042.   Specification of Letters Patent.   Patented Jan. 3, 1922.

Application filed April 9, 1920. Serial No. 372,463.

*To all whom it may concern:*

Be it known that I, ERNEST E. BOENING, a citizen of the United States, and a resident of Yonkers, Westchester County, and State of New York, have invented certain new and useful Improvements in Brakes, of which the following is a specification.

My present invention relates to improvements in brake mechanism, particularly for motor vehicles and other power driven apparatus.

The objects of the invention are to provide simple and efficient brake mechanism which will consist of but few and relatively inexpensive parts readily assembled, which will operate without "dragging," which will not require special brake linings and which with slight effort can be caused to exert a maximum braking force.

The invention involves a number of novel features of construction, combinations and arrangements of parts, as will be disclosed in the following specification.

In the drawing accompanying and forming a part of this specification I have illustrated the invention embodied in different practical forms, but wish it understood that the structure may be further modified without departure from the true spirit and scope of the invention as defined in the appended claims.

In the drawing referred to, Figure 1 is an elevation partly in section, illustrating a simple form of the braking mechanism.

Figures 2 and 3 are elevations, partly in sections, on substantially the planes of lines 2—2 and 3—3 of Figure 1.

Figure 4 is a view illustrating an embodiment of the brake as applied to a motor vehicle.

Figure 5 is a sectional elevation of the same as taken on substantially the plane of line 5—5 of Figure 4.

In the simple form of the invention first illustrated, 10 designates the element to be controlled which, in this instance, is a shaft. Fixed on this shaft are the two brake drums 11 and 12 provided each with edge flanges 13 and 14, the latter of which is indicated as removably held in place by means of securing bolts 15.

16 and 17 designate brake rings which consist in each instance of a substantially circular and practically rigid ring element surrounding the brake drum and lightly guided thereon between the confining flanges 13 and 14. These brake rings are shown as suspended by means of pivoted links 18 and 19 from a suitably supported rock shaft 20 which can be operated by means of a suitable handle lever 21. Turn buckle screws 22 may be interposed in these connections, for instance, between the suspension links and the brake rings for adjusting the relation of the brake rings to the brake drums.

With the construction described it will be apparent that when the brake lever is thrown to the right in Figure 1, the left hand brake ring 16 will be elevated so as to bring its lower peripheral portion into braking engagement with the lower peripheral portion of the brake drum 11 and that the right hand brake ring 17 will be lowered so as to bring the upper portion thereof into braking engagement with the upper peripheral portion of the brake drum 12. The parts are adjusted so that the application of these reversely operating braking forces is effected substantially simultaneously. This results in the application of a very powerful braking force to the element being controlled.

To prevent undue friction of the brake rings on the brake drums, I prefer to relieve them for a portion of their extent, as indicated in Figures 2 and 3. In Figure 2 the upwardly acting brake ring is shown as having an eccentrically relieved portion 23 at the lower end thereof and in Figure 3 the downwardly braking ring is indicated as having an eccentrically relieved portion 24 at the upper end thereof. These relieved portions, in fact, constitute the peripheral braking surfaces which normally stand free of the brake drums and are only brought into engagement with the brake drums through the operation of the actuating mechanism.

The friction of the rings on the drums is further reduced by making the rings of reduced width at the upper and lower portions thereof, as indicated at 25 and of sufficiently increased width at opposite central portions thereof, as indicated at 26 to form guides slidingly engaging between the flanges. These wider portions are the only parts which contact with the flanges and operate as guides to loosely center the brake rings on the brake drums.

In Figures 4 and 5 I have illustrated the adaptation of the invention to the rear axle of a motor vehicle. In this case the brake rings are shown as supported by means of the shafts 27 journaled in bearings 28 on the axle housing 29 and having the eccentric portions 30 journaled in the suspension lugs 31 provided on the brake rings. These shafts are shown as provided with rocker arms 32 connected to operate in opposition by means of a swinging link 33. The left hand rocker arm 32 is shown as engaged by a pull link 34 connected with the brake pedal or hand lever.

The operation of this braking mechanism may be the same as that previously described, in that one eccentric supporting element will operate in one direction to lift one of the brake rings and the other eccentric supporting element will be operated in the reverse direction to depress the other brake ring.

In Figure 5 I have shown how the brake rings may be relieved both at the top and at the bottom, as indicated at 35 and 36. This adapts the rings for interchangeable use.

To prevent the rings from swinging on their supports I have shown them as guided at their lower ends by means of the guide pins 37 operating in guide slots 38 provided in the lower ends of the brake rings.

This invention makes it possible to form the braking elements in one piece and in the form of a simple ring. These brake rings have a relatively large braking area in contact with the brake drums and require no special friction lining such as is necessary with the expanding and contracting brake bands now in common use. The brake rings may be adjusted so that they will normally ride practically free of engagement with the brake drums and without constantly dragging on the drums as is usually the case with the brake bands referred to. If desired, the rings may be lined with Babbitt metal to provide a smooth and silent gripping engagement and freedom from "chattering."

What I claim is:

1. In a brake, the combination with a brake drum, of a substantially rigid brake ring completely surrounding said brake drum, means for shifting said brake ring eccentrically of the drum to bind the same on the periphery of the drum and flanges at the opposite edges of the brake drum for loosely confining the brake ring thereto, said brake ring having wider portions for guiding contact with said flanges and portions of lesser width to be free of contact with such flanges.

2. Braking mechanism comprising a pair of brake drums, brake rings encircling said brake drums and means for substantially simultaneously shifting said brake rings in opposite directions and eccentrically of the brake drums to thereby carry the same in reverse directions into braking engagement with the peripheral portions of the drums.

3. In braking mechanism, a pair of brake drums, brake rings encircling said drums and means for loosely suspending said drum rings about the brake drums and for simultaneously shifting one brake ring upwardly and the other downwardly into braking engagement with the respective drums.

4. Braking mechanism comprising a brake drum, a substantially rigid brake ring supported in light guiding engagement with the peripheral portion of the drum and means for shifting said brake ring eccentrically of the drum to thereby carry the same into braking engagement with the peripheral portion of the drum, said brake ring being eccentrically relieved for a portion of its periphery.

5. In brake mechanism, a brake drum, flanges at the opposite edges of said drum, a brake ring encircling the drum and lightly confined between the flanges and means for bodily shifting said ring eccentrically of the drum to thereby bring the same into holding engagement with the peripheral portion of the drum, said brake ring having portions of greater width for guiding engagement with the flanges and portions of lesser width free of contact with such flanges.

6. Braking mechanism comprising a brake drum, a brake ring surrounding the same, means for suspending said brake ring about the drum and substantially free of contact therewith, said suspension means being adjustable to regulate the relation of the brake ring to the drum and being operable to shift the ring eccentrically of the drum.

7. The combination with a brake drum, of a friction member for cooperation therewith, means for retaining the member or the drum comprising widened sections on the friction member and flanges on the brake drum, and means connected to the said member intermediate said sections for moving it into braking action.

8. The combination with a brake drum, of a friction member therefor, means for radially shifting the member into and out of contact with the drum, means on the drum cooperating with spaced points on the friction member for holding it against lateral displacement, the said member gradually decreasing in width from said points to the point intermediate the same.

9. The combination with a brake drum, of a friction member therefor, means for radially shifting the member into and out of contact with the drum, means on the drum cooperating with spaced points on the friction member for holding it against lateral displacement, the said member gradually decreasing in width from said points to a point intermediate the same and means connected to the friction member at its point of minimum width for moving it toward and away from the drum.

In witness whereof, I have hereunto set my hand this 2nd day of April, 1920.

ERNEST E. BOENING.